(12) United States Patent
Ishizuka

(10) Patent No.: US 9,615,135 B2
(45) Date of Patent: Apr. 4, 2017

(54) DEVICES AND METHOD FOR RECOMMENDING CONTENT TO USERS USING A CHARACTER

(71) Applicant: Sony Computer Entertainment Inc., Tokyo (JP)

(72) Inventor: Kensaku Ishizuka, Tokyo (JP)

(73) Assignees: SONY CORPORATION, Tokyo (JP); SONY INTERACTIVE ENTERTAINMENT INC., Tokyo (JP)

(*) Notice: Subject to any disclaimer, the term of this patent is extended or adjusted under 35 U.S.C. 154(b) by 7 days.

(21) Appl. No.: 14/687,058

(22) Filed: Apr. 15, 2015

(65) Prior Publication Data
US 2015/0341693 A1    Nov. 26, 2015

(30) Foreign Application Priority Data

May 21, 2014 (JP) ................. 2014-104890

(51) Int. Cl.
| H04N 21/466 | (2011.01) |
| H04N 21/442 | (2011.01) |
| H04N 21/482 | (2011.01) |
| H04N 21/458 | (2011.01) |
| H04N 5/765 | (2006.01) |
| H04N 21/431 | (2011.01) |
| H04N 5/91 | (2006.01) |

(52) U.S. Cl.
CPC ......... *H04N 21/4668* (2013.01); *H04N 5/765* (2013.01); *H04N 21/431* (2013.01); *H04N 21/44222* (2013.01); *H04N 21/458* (2013.01); *H04N 21/482* (2013.01); *H04N 21/4826* (2013.01); *H04N 5/91* (2013.01)

(58) Field of Classification Search
CPC .................. H04N 21/4668; H04N 21/466
See application file for complete search history.

(56) References Cited

U.S. PATENT DOCUMENTS

| 6,931,656 | B1* | 8/2005 | Eshelman | H04N 5/44513 345/473 |
| 9,197,872 | B2* | 11/2015 | Bradley | H04N 21/25891 |
| 2010/0083320 | A1* | 4/2010 | Roberts | H04N 7/17318 725/61 |
| 2012/0059825 | A1* | 3/2012 | Fishman | G06F 17/30053 707/737 |
| 2015/0245098 | A1* | 8/2015 | Liew | H04N 21/25891 725/40 |
| 2015/0281635 | A1* | 10/2015 | Tang | H04N 5/85 386/295 |

FOREIGN PATENT DOCUMENTS

JP    2013-012954    1/2013

* cited by examiner

*Primary Examiner* — Brian T Pendleton
*Assistant Examiner* — Frank Johnson-Calderon
(74) *Attorney, Agent, or Firm* — Katten Muchin Rosenman LLP

(57) ABSTRACT

An information processing device includes: a recommendation information obtaining section obtaining information on a recommended content to be recommended to a user for viewing, the information being information transmitted from an external device or information stored in a predetermined storage area in advance; and a character display section displaying a predetermined character on a screen, and displaying information indicating that the character has interest in the recommended content on the screen.

5 Claims, 10 Drawing Sheets

| RECOMMENDATION ID | BROADCASTING STATION ID | PROGRAM ID | NUMBER OF RECORDING RESERVATIONS | CHARACTER COMMENT |
|---|---|---|---|---|
| 0001 | AAA | 0779 | 300 | I ANTICIPATE FOR NO PARTICULAR REASON THAT THERE MAY BE A SURPRISE THIS TIME. |
| 0002 | BBB | 1100 | 20 | BETWEEN YOU AND ME, I AM A GREAT FAN OF HEROINE XXX. |
| 0003 | AAA | 8765 | 40 | RECOMMENDED BY A STAFF MEMBER TAE. TAE SAYS "I CAN'T MISS IT WHEN I AM TOLD THAT IT IS ABOUT A FIGHT BETWEEN WOMEN." |
| 0004 | CCC | 4466 | 100 | NONE |

FIG. 3

| COMMENT ID | COMMENT TEXT | SCREEN CONDITION | DATE-AND-TIME CONDITION | PROGRAM SOURCE |
|---|---|---|---|---|
| 0001 | IT IS AN OPENING DAY OF THE WORLD CUP TODAY. | NONE | 2014/6/12 | NONE |
| 0002 | AMONG VIDEOS I HAVE NOT WATCHED, I WANT TO WATCH "$ PROGRAM TITLE." | FOCUS IS PUT ON VIDEO ICON ON TOP SCREEN | NONE | RECORDED PROGRAM NOT YET VIEWED |
| 0003 | I ALWAYS WATCH "$ PROGRAM TITLE." | FOCUS IS PUT ON PROGRAM GUIDE ICON ON TOP SCREEN, OR STANDBY SCREEN IS BEING DISPLAYED | NONE | PROGRAM INDICATED BY RECOMMENDATION INFORMATION |
| 0004 | I DON'T MIND WATCHING "$ PROGRAM TITLE" OVER AND OVER AGAIN. | FOCUS IS PUT ON VIDEO ICON ON TOP SCREEN, OR STANDBY SCREEN IS BEING DISPLAYED | NONE | ALREADY VIEWED RECORDED PROGRAM |
| 0005 | "$ PROGRAM TITLE" SEEMS TO BE POPULAR. I ALSO WATCH "$ PROGRAM TITLE." | FOCUS IS PUT ON TV ICON ON TOP SCREEN, OR STANDBY SCREEN IS BEING DISPLAYED | NONE | 500 OR MORE VIEWERS |
| 0006 | I HAVE RECENTLY BEEN INTERESTED IN "$ PROGRAM TITLE." | FOCUS IS PUT ON PROGRAM GUIDE ICON ON TOP SCREEN, OR STANDBY SCREEN IS BEING DISPLAYED | NONE | 300 OR MORE RECORDING RESERVATIONS |

38

F I G. 4

| RECOMMENDATION ID | BROADCASTING STATION ID | PROGRAM ID | NUMBER OF RECORDING RESERVATIONS | CHARACTER COMMENT |
|---|---|---|---|---|
| 0001 | AAA | 0779 | 300 | I ANTICIPATE FOR NO PARTICULAR REASON THAT THERE MAY BE A SURPRISE THIS TIME. |
| 0002 | BBB | 1100 | 20 | BETWEEN YOU AND ME, I AM A GREAT FAN OF HEROINE XXX. |
| 0003 | AAA | 8765 | 40 | RECOMMENDED BY A STAFF MEMBER TAE. TAE SAYS "I CAN'T MISS IT WHEN I AM TOLD THAT IT IS ABOUT A FIGHT BETWEEN WOMEN." |
| 0004 | CCC | 4466 | 100 | NONE |

39

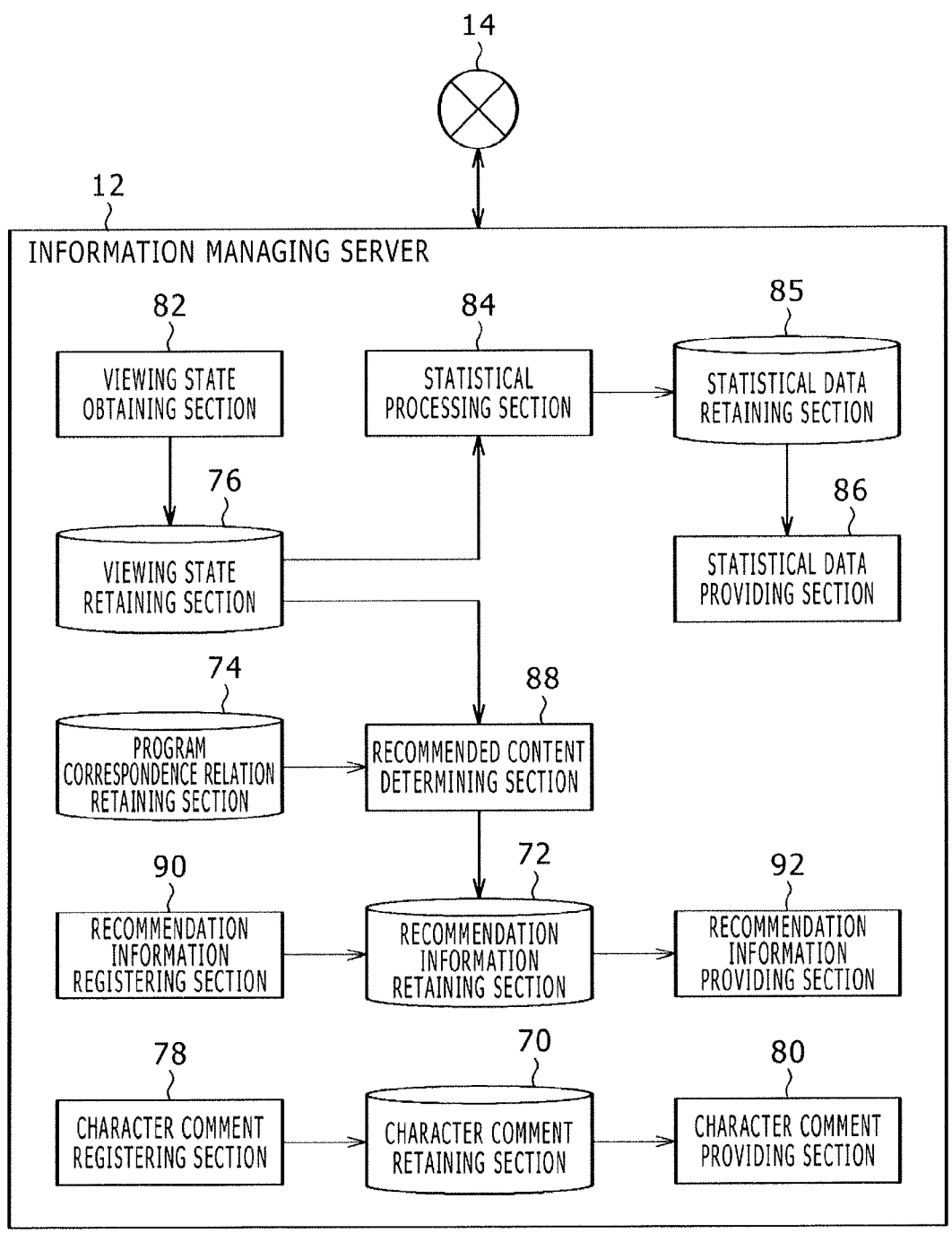

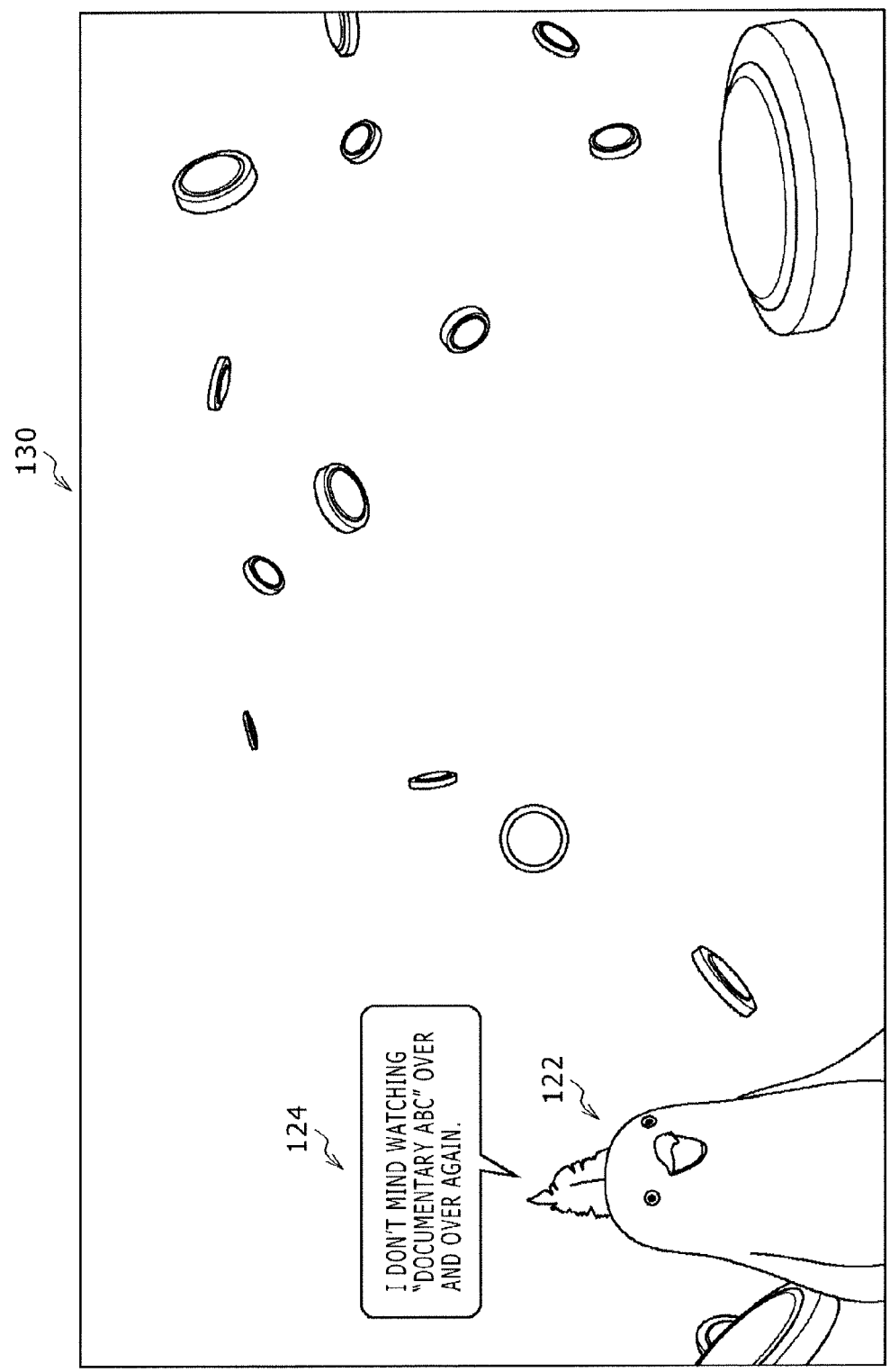

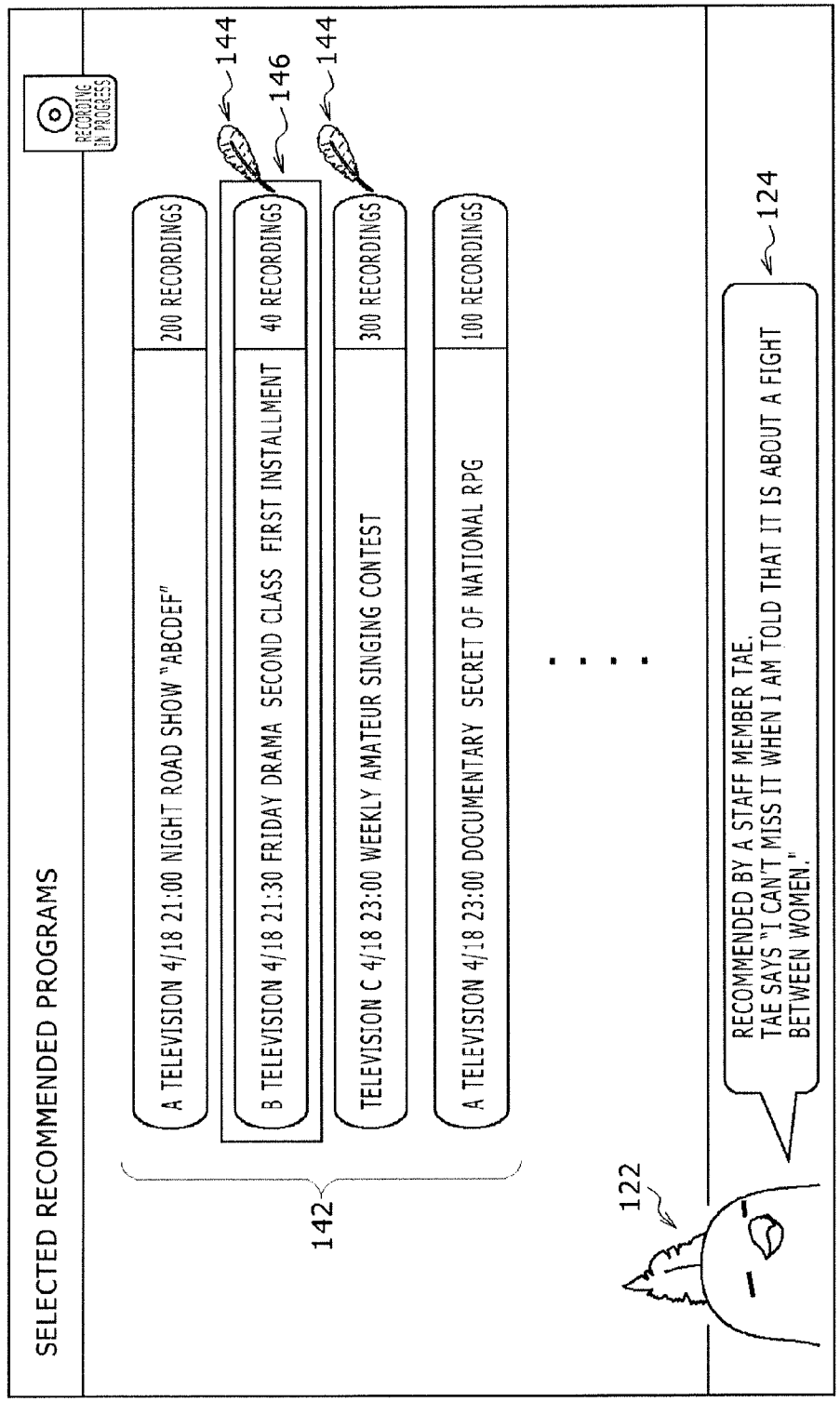

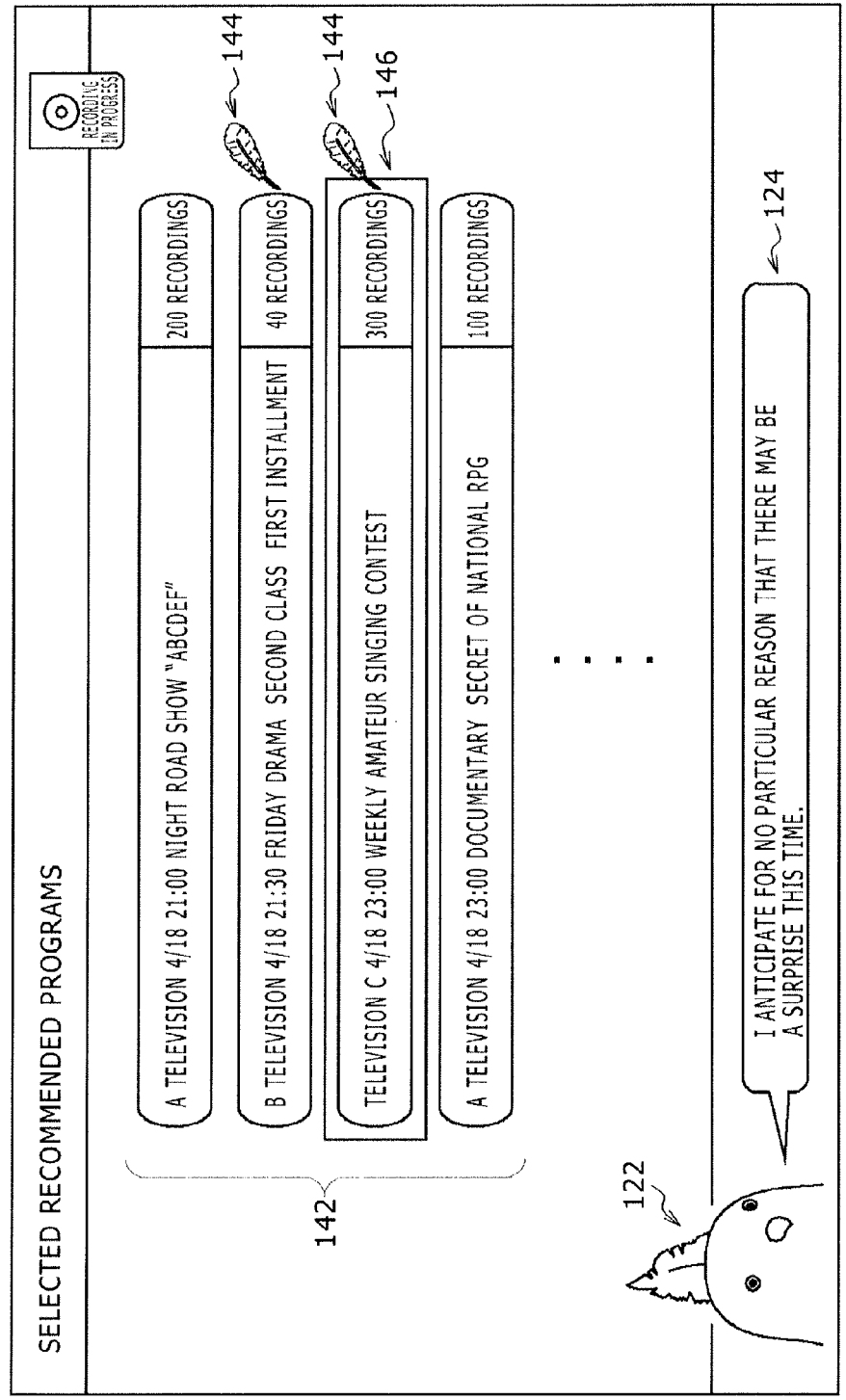

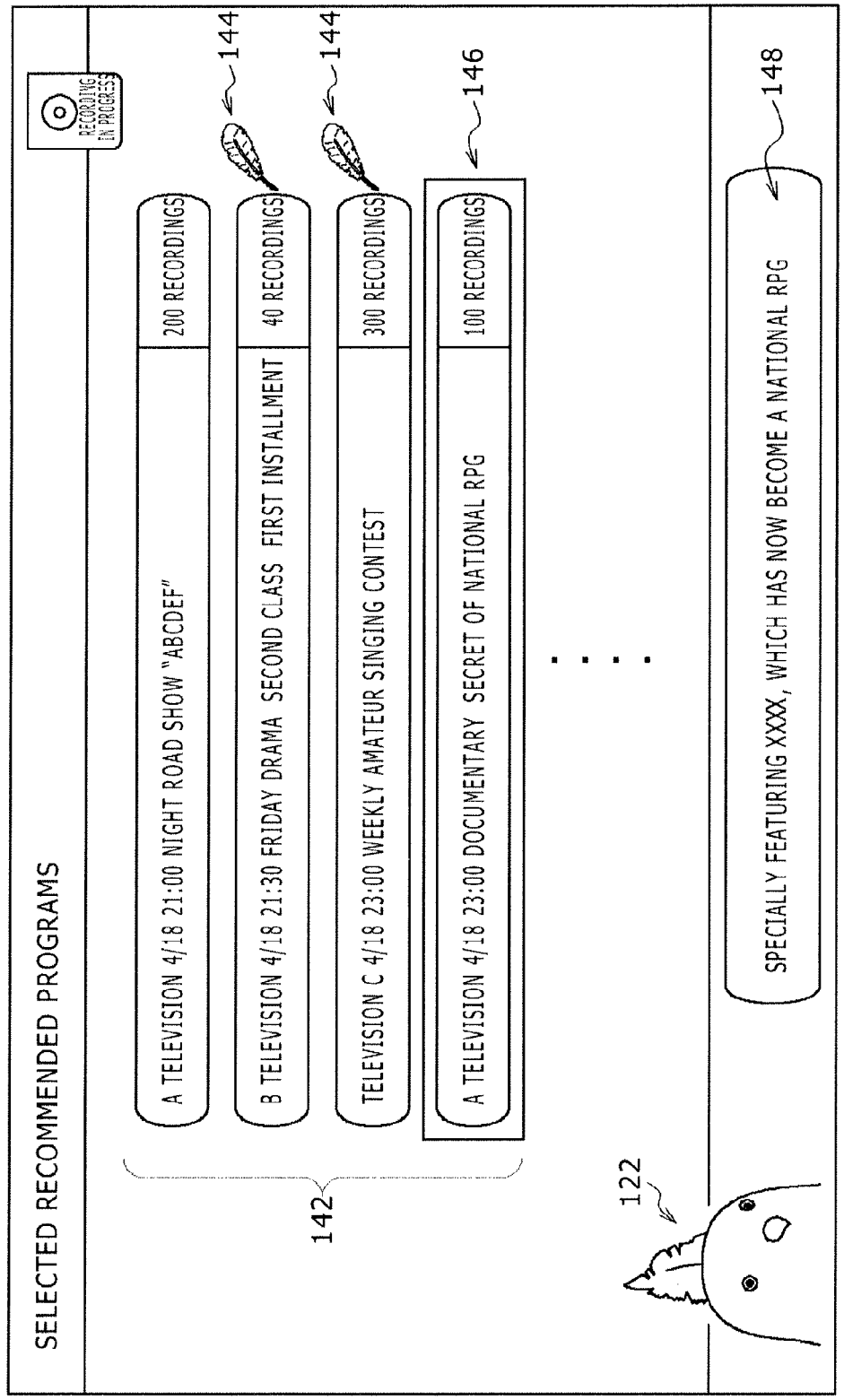

DEVICES AND METHOD FOR RECOMMENDING CONTENT TO USERS USING A CHARACTER

BACKGROUND

The present technology relates to an information processing device and an information processing method.

The present applicant has proposed a technology for assisting in the viewing of electronic contents (see Japanese Patent Laid-Open No. 2013-012954, for example). In addition, there have recently been cases of recommended product information according to a purchase history of the user being displayed on an online shopping site on the Internet or the like.

SUMMARY

The present inventor considers that when contents recommended to a user for viewing on various kinds of information processing devices such as devices assisting in the viewing of television programs and the like are contents of no interest to the user, the convenience of the user may be impaired instead because of the recommendation of the contents. The present inventor also considers that there is room for improvement in a mode of presenting contents recommended to the user.

The present technology has been made on the basis of the recognition of the above problems by the present inventor. It is desirable to provide a technology for presenting contents to be recommended to a user for viewing in a suitable mode.

According to a mode of the present technology, there is provided an information processing device including: a recommendation information obtaining section obtaining information on a recommended content to be recommended to a user for viewing, the information being information transmitted from an external device or information stored in a predetermined storage area in advance; and a character display section displaying a predetermined character on a screen, and displaying information indicating that the character has interest in the recommended content on the screen.

Another mode of the present technology is an information processing method. This method makes a computer perform: obtaining information on a recommended content to be recommended to a user for viewing, the information being information transmitted from an external device or information stored in a predetermined storage area in advance; displaying a predetermined character on a screen; and displaying information indicating that the character has interest in the recommended content on the screen.

Further another mode of the present technology is a computer program. This computer program for a computer, includes: obtaining information on a recommended content to be recommended to a user for viewing, the information being information transmitted from an external device or information stored in a predetermined storage area in advance; and displaying a predetermined character on a screen, and displaying information indicating that the character has interest in the recommended content on the screen.

It is to be noted that arbitrary combinations of the above constituent elements as well as modes realized by converting expressions of the present technology between a system, a program, a recording medium storing the program, and the like are also effective as modes of the present technology.

According to the present technology, it is possible to present contents to be recommended to a user for viewing in a suitable mode.

BRIEF DESCRIPTION OF THE DRAWINGS

FIG. 3 is a diagram showing comment data retained by a character data retaining section;

FIG. 4 is a diagram showing recommended program information retained by a recommendation information retaining section;

FIG. 5 is a block diagram showing a functional configuration of an information managing server in FIG. 1;

FIG. 7 is a diagram showing a standby screen of the program viewing App;

FIG. 8 is a diagram showing a recommendation information screen of the program viewing App;

FIG. 9 is a diagram showing the recommendation information screen of the program viewing App; and FIG. 10 is a diagram showing the recommendation information screen of the program viewing App.

DETAILED DESCRIPTION OF THE PREFERRED EMBODIMENTS

Figure 1:
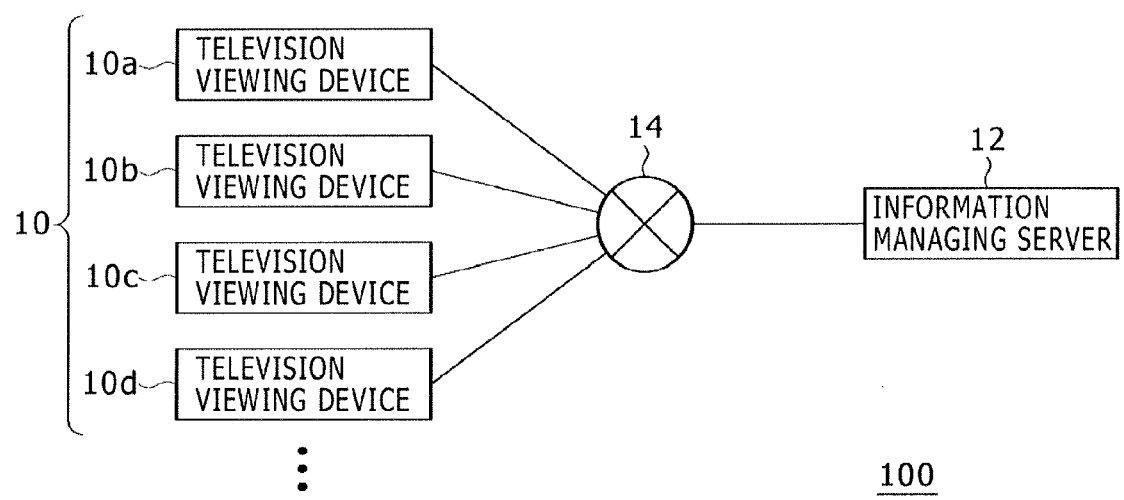
FIG. 1 is a diagram showing a configuration of an entertainment system according to an embodiment.

An entertainment system according to an embodiment determines a program to be recommended to each user for viewing or recording (which program will hereinafter be referred to also as a "recommended program") on the basis of recording reservation states of a plurality of users for a plurality of broadcast programs, and presents information on recommended programs to each user. The present inventor has found the following problems while engaging in the construction of an entertainment system.

(1) Determination of Recommended Program

The present inventor has found as a result of collecting the recording reservation states of a plurality of users that about 80 percent of recording reservations of a program broadcast a plurality of times over a plurality of days are not recording reservations of a broadcast of one installment (which recording reservations will hereinafter be referred to also as "one-installment recordings"), but en bloc recording reservations of broadcasts of a plurality of installments (which recording reservations will hereinafter be referred to also as "every-installment recordings"). For example, when one recording is set for a first installment of a drama program broadcast every week, only the first installment is recorded, and recording reservations of a second installment and subsequent installments need to be made separately. On the other hand, when every-installment recording is set, not only is the first installment recorded but also the second and subsequent installments are recorded automatically. In addition, the present inventor has found that programs whose recording reservations are made with a high frequency concentrate in a particular genre, and that when programs whose recording reservations are made in large numbers are simply set as recommended programs, the recommended programs concentrate in a particular genre (for example animated cartoons).

Accordingly, the entertainment system according to the embodiment identifies a type of recording reservation by each of a plurality of users, and determines a recommended program on the basis of whether the type of recording reservation is an every-installment recording or a one-installment recording. Specifically, a program whose one-installment recordings, rather than every-installment recordings, account for a predetermined threshold value or more (for example 40% or more) of a total number of recording reservations is determined as a recommended program. Unlike an every-installment recording, which is performed automatically once the every-installment recording has been set, a one-installment recording is set by the user aware of a particular broadcast installment. Hence, a broadcast installment whose one-installment recordings constitute a large proportion in a program broadcast a plurality of times over a plurality of days is considered to be contents that attract users who usually do not view the program (for example the contents include the appearance of a popular actor or a surprise), and is thus considered to be suitable as a recommended program.

(2) Mode of Presentation of Recommended Program

Preferences in programs differ from person to person. Thus, of course, a user may not have any interest in a recommended program that the entertainment system presents to the user. In addition, a program that does not suit the preferences of the user can be a recommended program. The present inventor considers that when a recommended program is presented in a mode "this program is recommended to you" or in a mode "there is a program that may interest you," and the user does not have any interest in the recommended program, the user may feel that the computer has recommended a boring program, and thus the user may be offended.

The entertainment system according to the embodiment provides a character that is a mascot of an application installed on a user terminal and which plays the role of a concierge presenting a recommended program to the user. When presenting a recommended program to the user, the character is made to murmur in the first-person to the effect that the character itself has interest in the recommended program. The character thereby makes the user recognize that the character has interest in the recommended program irrespective of whether or not the user has interest in the recommended program.

The accuracy of recommended programs inevitably has a limit, and a degree of matching of a recommended program varies for each user. However, the present inventor considers that a hurdle for the accuracy of a recommended program can be lowered by presenting the recommended program to the user in a form of presenting the feelings of the character as in the embodiment. That is, according to the mode of presenting recommended programs in the embodiment, it is possible to reduce offense to the user even if the user does not have interest in a recommended program, while making the user recognize the title of the recommended program or the like.

FIG. 1 shows a configuration of an entertainment system according to the embodiment. An entertainment system 100 is an information processing system that assists in the viewing and recording of television programs and which provides useful information to the user. The entertainment system 100 includes a television viewing device 10a, a television viewing device 10b, a television viewing device 10c, a television viewing device 10d, . . . , which are referred to collectively as a television viewing device 10, and an information managing server 12. The television viewing device 10 and the information managing server 12 are connected to each other via a communication network 14 including a LAN (Local Area Network), a WAN (Wide Area Network), and the Internet.

The television viewing device 10 is an information processing device having application software installed thereon which application software assists the user in viewing a television program and recording a television program (which application software will hereinafter be referred to also as "television viewing App"). The television viewing device 10 according to the embodiment is a stationary type game machine. However, the television viewing device 10 according to the embodiment may be a portable type game machine, a set-top box, a general-purpose PC (Personal Computer), or the like. The user is an operator of the television viewing device 10, and is also a viewer of a television program.

The information managing server 12 is an information processing device that manages the viewing state of a television program on each of the plurality of television viewing devices 10. The information managing server 12 manages the viewing state of a program being broadcast now and the setting state of a recording reservation for a program scheduled to be broadcast in the future. In addition, the information managing server 12 retains various kinds of information for assisting in the viewing and recording of television programs on each of the plurality of television viewing devices 10, and provides the various kinds of information to the television viewing devices 10 as appropriate.

Figure 2:
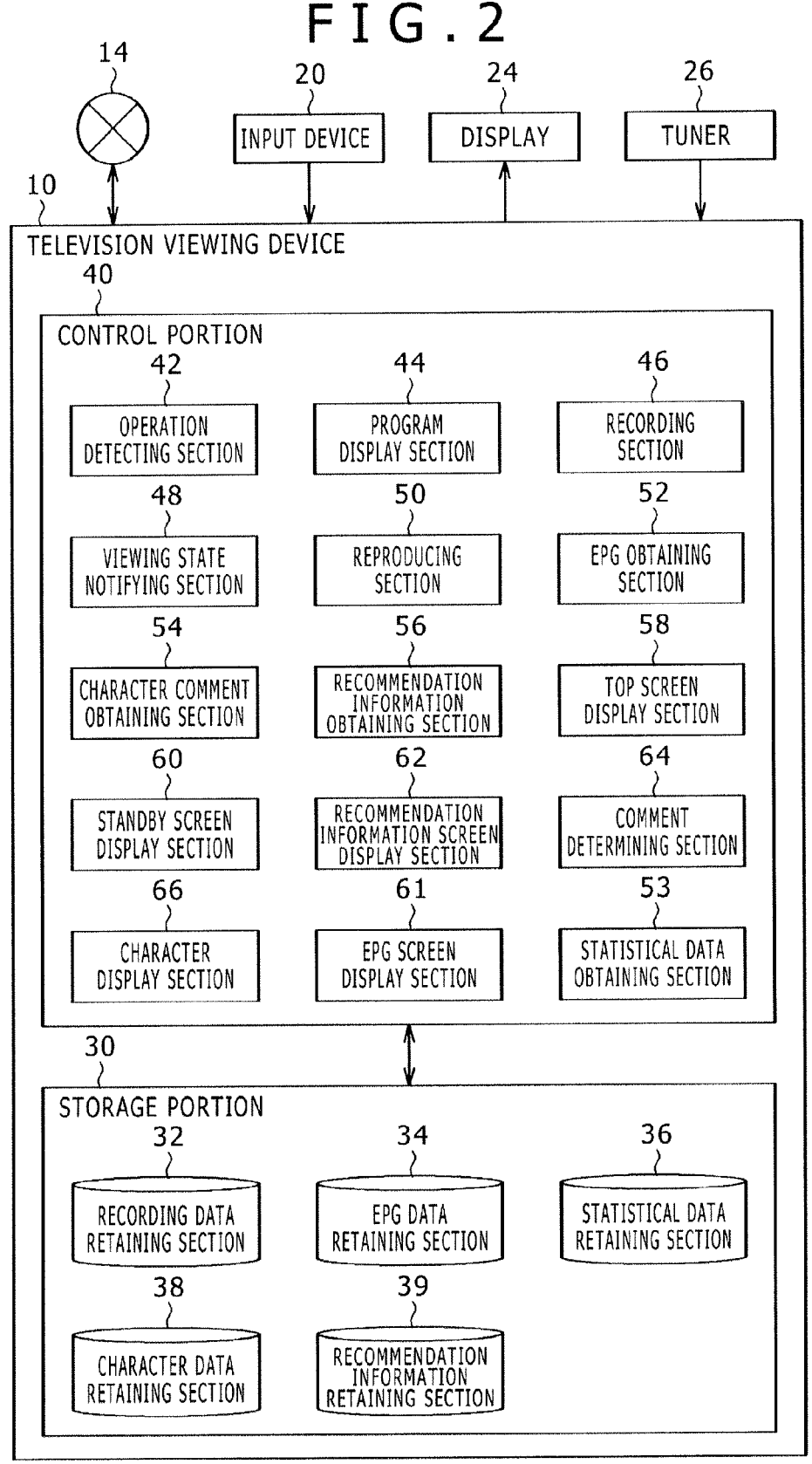
FIG. 2 is a block diagram showing a functional configuration of a television viewing device in FIG. 1.

FIG. 2 is a block diagram showing a functional configuration of the television viewing device 10 in FIG. 1. The television viewing device 10 is connected to an input device 20, a display 24, and a tuner 26. The input device 20 may be a controller dedicated to the game machine. At least one of the input device 20, the display 24, and the tuner 26 may be formed integrally with the television viewing device 10.

The tuner 26 may be various kinds of tuners for terrestrial digital television, for BS (Broadcast Satellite) broadcasting, and for CS (Communication Satellite) broadcasting. The tuner 26 receives a broadcast signal of a channel (broadcasting station) selected by the user, and decodes video information from the broadcast signal. The tuner 26 then sends out the video information to the television viewing device 10. In addition, the tuner 26 obtains EPG (Electronic Program Guide) data, which is a list of programs of broadcasting stations which programs can be viewed on the television viewing device 10, from the broadcast signal, and sends out the EPG data to the television viewing device 10.

The television viewing device 10 includes a storage portion 30 and a control portion 40. The control portion 40 controls data processing for assisting in the viewing and recording of television programs. The storage portion 30 is a storage area storing various kinds of data referenced or updated in the data processing of the control portion 40. The television viewing device 10 includes a communicating section not shown in FIG. 2, which communicating section communicates with an external device via the communication network 14 according to a predetermined protocol. The control portion 40 sends and receives data to and from the external device via the communicating section.

The blocks in the present specification can be implemented, in terms of hardware, by an element, an electronic circuit, and a mechanical device, which include the CPU (Central Processing Unit) of a computer and a memory, and implemented, in terms of software, by a computer program or the like. FIG. 2, however, depicts the functional blocks implemented by cooperation of hardware and software.

Hence, it is to be understood by those skilled in the art that these functional blocks can be implemented in various forms by combinations of hardware and software.

For example, the television viewing App including a program module corresponding to each functional block of the control portion 40 may be stored on a recording medium, and provided to the user. In addition, the television viewing App may be installed in a storage of the television viewing device 10 via the recording medium. In addition, a CPU and a GPU (Graphical Processing Unit) included in the television viewing device 10 may read out the program module included in the television viewing App to a main memory and execute the program module as appropriate to thereby exert each function of the control portion 40. In addition, a storage device such as a storage, a main memory, or the like may implement each functional block of the storage portion 30 by storing data.

The storage portion 30 includes a recording data retaining section 32, an EPG data retaining section 34, a statistical data retaining section 36, a character data retaining section 38, and a recommendation information retaining section 39.

The recording data retaining section 32 retains the recording data of broadcast programs. The recording data retaining section 32 retains the recording data in association with flags indicating whether or not the recording data has already been reproduced, or in other words, whether or not the user has already viewed the recorded programs. The EPG data retaining section 34 retains EPG data representing information on the broadcast programs of broadcasting stations which programs can be viewed in the environment of the user (for example the place of residence of the user or the like). The EPG data includes a broadcasting station ID (Identification), program ID, program title, broadcast time, and program outline (notice, cast information, and the like) of each of the plurality of broadcast programs.

The statistical data retaining section 36 retains statistical data on the viewing states of television programs by a plurality of users (plurality of television viewing devices 10), respectively, which data is provided from the information managing server 12. Specifically, the statistical data retaining section 36 retains the numbers of viewers of respective programs being broadcast now in association with the broadcasting station IDs and the program IDs of the respective programs. The statistical data retaining section 36 also retains the numbers of recording reservations of respective programs scheduled to be broadcast in the future in association with the broadcasting station IDs and the program IDs of the respective programs.

The character data retaining section 38 retains the image data of the mascot character (character 122 to be described later) of the program viewing App and comment data defining lines that the character is made to murmur. FIG. 3 shows the comment data retained by the character data retaining section 38. The comment data includes comment text, which is the bodies of the lines, conditions (screen conditions) defining screens on which to display the comments, conditions (date-and-time conditions) defining the dates and times at which to display the comments, and variable setting sources (program sources) of the comment text. In actual implementation, about 1000 records of comment data (1000 comments) may be stored.

The comment text in FIG. 3 includes greetings, information on current events (for example an ID "0001"), and recommendation information for broadcast programs and recorded programs (for example IDs "0002" to "0006"). Thus, murmurs of information on programs recommended for viewing and recording are unobtrusively incorporated while the character is made to murmur greetings and information on current events. A "$ program title" in FIG. 3 represents a variable. The title of a recorded program not viewed yet (ID "0002") or the title of a recommended program (ID "0003") is dynamically set as the "$ program title" at a time of comment display. Text indicating that the character itself is concerned about or interested in broadcast programs and recorded programs is set as the comment text of recommendation information for the programs. In other words, text in the first person which text indicates the feelings of the character about the programs is set. Incidentally, text in the third person which text indicates the feelings of a third person about the programs or text in hearsay forms may also be set as the comment text of recommendation information for the broadcast programs and the recorded programs.

The screen conditions and the date-and-time conditions in FIG. 3 are set arbitrarily. For example, as for the comment of the ID "0001," the comment text is displayed on a day specified by the date-and-time condition. In addition, as for the comment of the ID "0003," the comment text in which the title of a recommended program is set is displayed when a focus is put on a program guide icon on a top screen or during the display of a standby screen. In addition, as for the comment of the ID "0005," the comment text in which the title of a program whose viewers number 500 or more is set is displayed when the focus is put on a TV (Television) icon on the top screen or during the display of the standby screen.

Returning to FIG. 2, the recommendation information retaining section 39 retains information on recommended programs to be recommended to the user for viewing and recording, which information is provided from the information managing server 12. FIG. 4 shows recommended program information retained by the recommendation information retaining section 39. The lines of the character are arbitrarily set in character comment fields. For example, as with the comment text in the character data retaining section 38, text in the first person which text indicates that the character itself is concerned about or interested in the programs is set as the lines of the character (for example the IDs "0001" and "0002"). In addition, text in the third person which text indicates the feelings of a third person about the programs or text in hearsay forms is set as other lines (for example the ID "0003").

Returning to FIG. 2, the control portion 40 includes an operation detecting section 42, a program display section 44, a recording section 46, a viewing state notifying section 48, a reproducing section 50, an EPG obtaining section 52, a statistical data obtaining section 53, a character comment obtaining section 54, a recommendation information obtaining section 56, a top screen display section 58, a standby screen display section 60, an EPG screen display section 61, a recommendation information screen display section 62, a comment determining section 64, and a character display section 66.

The operation detecting section 42 detects a user operation on the program viewing App, which user operation is input to the input device 20, and notifies details of the operation to other functional blocks. When a broadcasting station selecting operation is input by the user during the TV screen display of the program viewing App, the program display section 44 obtains program video being broadcast now by a selected broadcasting station from the tuner 26, and displays the program video on the display 24. When the broadcasting station selecting operation is input, the viewing state notifying section 48 transmits information indicating the program being viewed now (which information will hereinafter be referred to also as "currently viewed program information") to the information managing server 12. The currently viewed program information includes a user ID, a viewing flag, and the identifying information of the program being viewed (for example the broadcasting station ID and the program ID).

When a recording reservation operation has been input by the user during the EPG screen display of the program viewing App, the recording section 46 records a recording target program at a time of broadcasting of the program. The recording section 46 stores the recording data of the program in the recording data retaining section 32 in association with a flag indicating that the program is yet to be viewed. When the recording reservation operation is input, the viewing state notifying section 48 transmits information indicating the program for which the recording reservation is set (hereinafter referred to also as "recording reservation program information") to the information managing server 12. The recording reservation program information includes the user ID, a recording reservation flag, the identifying information of the recording target program (for example a broadcasting station ID and a program ID), and the type of the recording reservation (information indicating every-installment recording or one-installment recording).

When a recorded program reproduction operation is input by the user during the video screen display of the program viewing App, the reproducing section 50 obtains the recorded data of a reproduction target program from the recording data retaining section 32, reproduces program video, and displays the program video on the display 24. The reproducing section 50 changes the flag of the reproduced recorded data to "already viewed." The EPG obtaining section 52 obtains EPG data from the tuner 26, and stores the EPG data in the EPG data retaining section 34.

When the statistical data obtaining section 53 detects the passage of a predetermined period from the obtainment of previous data, the statistical data obtaining section 53 obtains statistical data indicating the states of viewing or the states of recording reservation of programs by a plurality of users (plurality of television viewing devices 10) from the information managing server 12, and stores the statistical data in the statistical data retaining section 36. Intervals at which to obtain the statistical data may be a few ten minutes to a few hours.

The statistical data includes the identifying information of each program (for example a broadcasting station ID and a program ID) and the number of viewers and/or the number of recording reservations. The number of viewers represents the number of users viewing each program being broadcast now, the number of users being counted by the information managing server 12 on the basis of notifications from the plurality of television viewing devices 10. The number of recording reservations represents the number of users who have set recording reservations of each program scheduled to be broadcast in the future, the number of users being counted by the information managing server 12 on the basis of notifications from the plurality of television viewing devices 10.

When the character comment obtaining section 54 detects the passage of a predetermined period from the obtainment of previous data, the character comment obtaining section 54 obtains latest comment data (FIG. 3) representing lines of the character from the information managing server 12, and stores the latest comment data in the character data retaining section 38. Intervals at which to obtain the comment data may be one day or a few hours. When the recommendation information obtaining section 56 detects the passage of a predetermined period from the obtainment of previous information, the recommendation information obtaining section 56 obtains latest recommended program information (FIG. 4) from the information managing server 12, and stores the latest recommended program information in the recommendation information retaining section 39. Intervals at which to obtain the recommended program information may be one day or a few hours.

The top screen display section 58 displays the top screen of the program viewing App on the display 24. The standby screen display section 60 displays the standby screen of the program viewing App on the display 24. The recommendation information screen display section 62 displays the recommendation information screen of the program viewing App on the display 24. Concrete examples of these screens will be described later.

The EPG screen display section 61 displays an EPG screen showing an electronic program guide obtained by arranging information on a plurality of programs that can be viewed by the user in a table including a channel axis and a time axis. The EPG screen display section 61 displays the numbers of viewers of the respective programs (which numbers will hereinafter be referred to also as a "viewing value") and the numbers of recording reservations of the respective programs (which numbers will hereinafter be referred to also as a "recording value") in association with the respective programs in the electronic program guide.

The comment determining section 64 determines whether or not to display a character comment retained by the character data retaining section 38 during display of each screen of the program viewing App. When comments have been displayed a predetermined number of times in one day, the comment determining section 64 suppresses subsequent comment display in that day. When a next day comes, or in other words, when a date is changed, the comment determining section 64 resumes comment display. In addition, the comment determining section 64 selects a comment to be displayed as a line of the character from among a plurality of comments according to a screen condition and a date-and-time condition set for each piece of comment data. A comment displayed once in a certain day may be excluded from the objects for selection in that day.

The character display section 66 displays an image of the mascot character of the program viewing App which mascot character is retained by the character data retaining section 38 on each screen of the program viewing App. In addition, the character display section 66 displays comment text selected by the comment determining section 64, which comment text is retained by the character data retaining section 38, in a mode of indicating a line of the character. As already described with reference to FIG. 3, the comment text displayed by the character display section 66 includes text in the first person which text indicates that the character has interest in a recommended program.

In addition, when a focus is put on a particular recommended program on the recommendation information screen of the program viewing App, and a character comment is added to the recommended program, the character display section 66 displays the comment. As already described with reference to FIG. 4, the character comment includes text in the first person which text indicates that the character has interest in the recommended program.

FIG. 5 is a block diagram showing a functional configuration of the information managing server 12 in FIG. 1. The information managing server 12 includes a character comment retaining section 70, a recommendation information retaining section 72, a program correspondence relation retaining section 74, a viewing state retaining section 76, a character comment registering section 78, a character comment providing section 80, a viewing state obtaining section 82, a statistical processing section 84, a statistical data retaining section 85, a statistical data providing section 86, a recommended content determining section 88, a recommendation information registering section 90, and a recommendation information providing section 92.

The character comment retaining section 70 retains the character comment data to be provided to the television viewing device 10, which comment data has already been described with reference to FIG. 3. The recommendation information retaining section 72 retains the recommended program information to be provided to the television viewing device 10, which information has already been described with reference to FIG. 4.

In this case, the recommendation information retaining section 72 stores information on a first recommended program extracted from a plurality of programs on the basis of program viewing states in the plurality of television viewing devices 10, that is, program viewing states of the plurality of users. The recommendation information retaining section 72 further stores information on a second recommended program satisfying a predetermined condition other than the program viewing states in the plurality of television viewing devices 10. The recommended program information obtained by the recommendation information obtaining section 56 of the foregoing television viewing device 10 and stored in the recommendation information retaining section 39 similarly includes the information on the first recommended program and the information on the second recommended program.

As will be described later in relation to the recommended content determining section 88, the first recommended program in the embodiment is a recommended program determined by the recommended content determining section 88 on the basis of a ratio of one-installment recordings as the setting states of recording reservations in the plurality of television viewing devices 10. The determination of the first recommended program may be susceptible of various modifications. For example, the recommended content determining section 88 may determine, as the recommended program, a program having a relatively large number of viewers (viewing value) (or whose number of viewers is equal to or more than a predetermined threshold value) among a plurality of programs being broadcast now. In addition, the recommended content determining section 88 may determine, as the recommended program, a program having a relatively large number of recording reservations (recording value) (or whose number of recording reservations is equal to or more than a predetermined threshold value) among a plurality of programs scheduled to be broadcast in the future.

The second recommended program can be said to be determined by an algorithm different from an algorithm for determining the first recommended program, and can be said to be determined on the basis of different basic data not dependent on basic data (for example viewing states) for determining the first recommended program. As will be described later in relation to the recommendation information registering section 90, suppose that the second recommended program in the embodiment is arbitrarily set by a staff managing the entertainment system 100, and satisfies a condition as a recommended program when the managing staff registers the second recommended program with the information managing server 12. The second recommended program may also be susceptible of various modifications.

For example, the managing staff may register a keyword for extracting a recommended program (which keyword hereinafter includes a phrase) with the information managing server 12 in advance. In addition, the information managing server 12 may obtain keywords that have become topics in various kinds of social networking service, social media, electronic bulletin boards, and the like from a predetermined external device. A second recommended content determining section not shown in the figures may search information (EPG data or the like) on a plurality of programs using the above keyword as a search key. The second recommended content determining section not shown in the figures may determine, as a recommended program, a program whose text information on a title, an outline, a cast, and the like includes the above keyword, and store information on the recommended program in the recommendation information retaining section 39.

The program correspondence relation retaining section 74 retains correspondence relation between a program broadcast by a first broadcasting station and a program broadcast by a second broadcasting station different from the first broadcasting station. This correspondence relation is linking information for the information managing server 12 to treat a plurality of programs having different combinations of broadcasting station IDs and program IDs as essentially identical programs. In addition, this correspondence relation is set in advance by the staff managing the entertainment system 100.

In a typical case where the first broadcasting station and the second broadcasting station are in affiliated relation to each other, and the first broadcasting station is a key station, while the second broadcasting station is a local station using programs produced by the key station as main broadcast contents, correspondence relation is set between a program of the first broadcasting station and a program of the second broadcasting station. For example, a correspondence relation may be set between a program "seven-o'clock news" broadcast by a broadcasting station A and a program "seven-o'clock news" broadcast by a broadcasting station B that is in affiliated relation to the broadcasting station A (the program broadcast by the broadcasting station B in this case having a same program title but having a different broadcasting station ID and a different program ID).

The viewing state retaining section 76 retains currently viewed program information indicating programs being viewed now by a plurality of users, or in other words, in a plurality of television viewing devices 10, and recording reservation program information indicating programs whose recording reservations have been set by a plurality of users, or in other words, in a plurality of television viewing devices 10.

The character comment registering section 78 obtains character comment data transmitted from a terminal (not shown) of the staff managing the entertainment system 100, and stores the character comment data in the character comment retaining section 70. Arbitrary contents can be set as character comments. However, text indicating that the character itself has interest in a recommended program is desirably set as a comment recommending a program. The character comment providing section 80 transmits the comment data stored in the character comment retaining section 70 to a television viewing device 10 in response to a request from the television viewing device 10.

The viewing state obtaining section 82 obtains the currently viewed program information transmitted from the television viewing devices 10, and stores the currently viewed program information in the viewing state retaining section 76. The viewing state obtaining section 82 also obtains the recording reservation program information transmitted from the television viewing devices 10, and stores the recording reservation program information in the viewing state retaining section 76.

The statistical processing section 84 generates statistical data indicating the viewing state and the recording reservation state of each program by counting the currently viewed program information and the recording reservation program information stored in the viewing state retaining section 76 in program units periodically, for example once an hour. Specifically, the statistical processing section 84 counts a number of records in the currently viewed program information using a broadcasting station ID and a program ID as a key, and identifies the number of records as the number of viewers (viewing value) of the program identified by the broadcasting station ID and the program ID. In addition, the statistical processing section 84 counts a number of records in the recording reservation program information using a broadcasting station ID and a program ID as a key, and identifies the number of records as the number of recording reservations (recording value) of the program identified by the broadcasting station ID and the program ID.

The statistical processing section 84 stores the number of viewers and/or the number of recording reservations of each program as data indicating a result of statistical processing for each program in the statistical data retaining section 85. The statistical data providing section 86 transmits the number of viewers and/or the number of recording reservations of each program, which data is stored in the statistical data retaining section 85, to a television viewing device 10 in response to a request from the television viewing device 10. Specifically, the statistical data providing section 86 transmits combinations of broadcasting station IDs, program IDs, recording values, and viewing values.

The recommended content determining section 88 determines a recommended program periodically, for example once a day, on the basis of the recording reservation program information stored in the viewing state retaining section 76. The recommended program is the above-described first recommended program. The recommended content determining section 88 stores the broadcasting station ID, the program ID, and the number of recording reservations of the recommended program in the recommendation information retaining section 72.

Specifically, the recommended content determining section 88 counts the number of recording reservations (recording value) of each program identified by a broadcasting station ID and a program ID, and identifies programs whose numbers of recording reservations are equal to or more than a first threshold value (which programs will hereinafter be referred to also as "recommendation candidate programs"). The first threshold value is to exclude programs whose numbers of recording reservations are relatively small, and is to ensure that filtering using the first threshold value provides popular programs that deserve recommendation. A concrete first threshold value may be determined by the knowledge and experience of the staff managing the entertainment system 100, an experiment using the entertainment system 100, or the like.

The recommended content determining section 88 counts the number of records in which a one-installment recording is set as a type of recording reservation for each of the plurality of recommendation candidate programs. The recommended content determining section 88 then determines, as a recommended program, a program whose ratio of one-installment recordings to a total number of recording reservations is equal to or more than a second threshold value among the recommendation candidate programs. In other words, the recommended content determining section 88 determines, as a recommended program, a program whose ratio of one-installment recordings is high relative to every-installment recordings. A concrete second threshold value may also be determined by the knowledge and experience of the staff managing the entertainment system 100 or an experiment using the entertainment system 100. The second threshold value may be for example 40%.

As a modification, the recommended content determining section 88 may identify programs having relatively large numbers of recording reservations as recommendation candidate programs in place of filtering using the first threshold value. For example, the recommended content determining section 88 may identify programs having 50 largest numbers of recording reservations as recommendation candidate programs. As another modification, the recommended content determining section 88 may determine recommendation candidate programs whose ratio of one-installment recordings to the number of recording reservations is relatively high as recommended programs in place of filtering using the second threshold value. For example, the recommended content determining section 88 may determine recommendation candidate programs having 10 highest ratios of one-installment recordings to the numbers of recording reservations as recommended programs. As another modification, without once determining recommendation candidate programs, the recommended content determining section 88 may determine a recommended program directly from among all programs on the basis of ratios of one-installment recordings to the numbers of recording reservations.

When the recommended content determining section 88 determines a first program (for example a program broadcast by a key station) as a recommended program, the recommended content determining section 88 refers to a correspondence relation retained by the program correspondence relation retaining section 74, and determines a second program (for example a program broadcast by a local station) associated with the first program as another recommended program. For example, the recommended content determining section 88 may count the numbers of recording reservations of the programs broadcast by the key station, and determine a recommended program among the programs broadcast by the key station. The recommended content determining section 88 may then further determine, as a recommended program, a program broadcast by the local station which program is associated with the program broadcast by the key station and set as the recommended program.

In general, the number of viewers of a local station is smaller than the number of viewers of a key station, while there may be program contents common to the local station and the key station. According to the mode of the embodiment, recommended program information determined on the basis of the states of recording reservations of programs broadcast by the key station can be extended to programs broadcast by the local station. That is, useful recommended program information can be provided to users living in various areas.

The recommendation information registering section 90 obtains a character comment for a recommended program determined by the recommended content determining section 88, which character comment is transmitted from the terminal of the staff managing the entertainment system 100, and stores the character comment in the recommendation information retaining section 72. Arbitrary contents can be set as the character comment. However, in a suitable mode, text in the first person which text indicates that the character itself has interest in the recommended contents is set as the character comment.

In addition, the recommendation information registering section 90 stores information (a broadcasting station ID, a program ID, and a character comment) on a recommended program determined by the managing staff, which information is transmitted from the terminal of the managing staff, in the recommendation information retaining section 72. The recommended program is the above-described second recommended program. At this time, the recommendation information registering section 90 obtains the number of recording reservations of the recommended program from the viewing state retaining section 76, and stores the number of recording reservations of the recommended program in the recommendation information retaining section 72. The recommended program in this case is a recommended program arbitrarily determined by the managing staff without undergoing the recommended program determination processing by the recommended content determining section 88. For example, the managing staff may register a television drama on which a movie to be newly released is based or a television program on which a cast member of a movie to be newly released appears as a recommended program with the information managing server 12.

The recommendation information providing section 92 transmits the recommended program information retained in the recommendation information retaining section 72 to a television viewing device 10 in response to a request from the television viewing device 10.

The operation of the entertainment system 100 having the above-described configuration will be described in the following.

The staff managing the entertainment system 100 records correspondence relations between programs in the program correspondence relation retaining section 74 according to program guides for respective areas in which the television viewing devices 10 are installed and affiliation relations between broadcasting stations. The viewing state obtaining section 82 of the information managing server 12 obtains currently viewed program information and recording reservation program information successively transmitted from each of the plurality of television viewing devices 10, and stores the currently viewed program information and the recording reservation program information in the viewing state retaining section 76. The statistical processing section 84 counts viewing values for programs being broadcast now and recording values for programs scheduled to be broadcast in the future, and stores the viewing values and the recording values in the statistical data retaining section 85. The counting data of the viewing values and the recording values of the respective programs is updated periodically.

The recommended content determining section 88 refers to the recording reservation program information stored in the viewing state retaining section 76, distinguishes the every-installment recordings and one-installment recordings of each program from each other, and determines, as a recommended program, a program having a high ratio of one-installment recordings among programs for which recording reservations have been set. The recommended content determining section 88 stores information on the recommended program in the recommendation information retaining section 72. The staff managing the entertainment system 100 registers a character comment for the recommended program whose recommended program information is stored in the recommendation information retaining section 72 with the information managing server 12. The recommendation information registering section 90 stores the character comment received from the terminal of the managing staff in the recommendation information retaining section 72 in association with the recommended program. The recommended program information is updated periodically.

In addition, the managing staff registers a program desired to be recommended to users among programs not selected as recommended programs by the recommended content determining section 88 as a recommended program with the information managing server 12. The recommendation information registering section 90 stores information on the recommended program which information is received from the terminal of the managing staff in the recommendation information retaining section 72. In addition, the managing staff registers a comment desired to be murmured by the mascot character on each screen of the program viewing App with the information managing server 12. The character comment registering section 78 stores the character comment received from the terminal of the managing staff in the character comment retaining section 70.

The user of the television viewing device 10 starts the program viewing App installed on the television viewing device 10. At the time of the start of the program viewing App, the EPG obtaining section 52 obtains EPG data from the tuner 26, and stores the EPG data in the EPG data retaining section 34. The statistical data obtaining section 53 requests statistical data from the information managing server 12. The statistical data providing section 86 of the information managing server 12 transmits the viewing values and recording values of respective programs to the television viewing device 10. The statistical data obtaining section 53 stores these pieces of data in the statistical data retaining section 36.

In addition, at the time of the start of the program viewing App, the character comment obtaining section 54 requests character comment data from the information managing server 12. The character comment providing section 80 of the information managing server 12 transmits the comment data to the television viewing device 10. The character comment obtaining section 54 stores the comment data in the character data retaining section 38. The recommendation information obtaining section 56 requests recommended program information from the information managing server 12. The recommendation information providing section 92 of the information managing server 12 transmits the recommended program information to the television viewing device 10. The recommendation information obtaining section 56 stores the recommended program information in the recommendation information retaining section 39. These pieces of data obtainment processing are repeated at predetermined time intervals.

Figure 6:
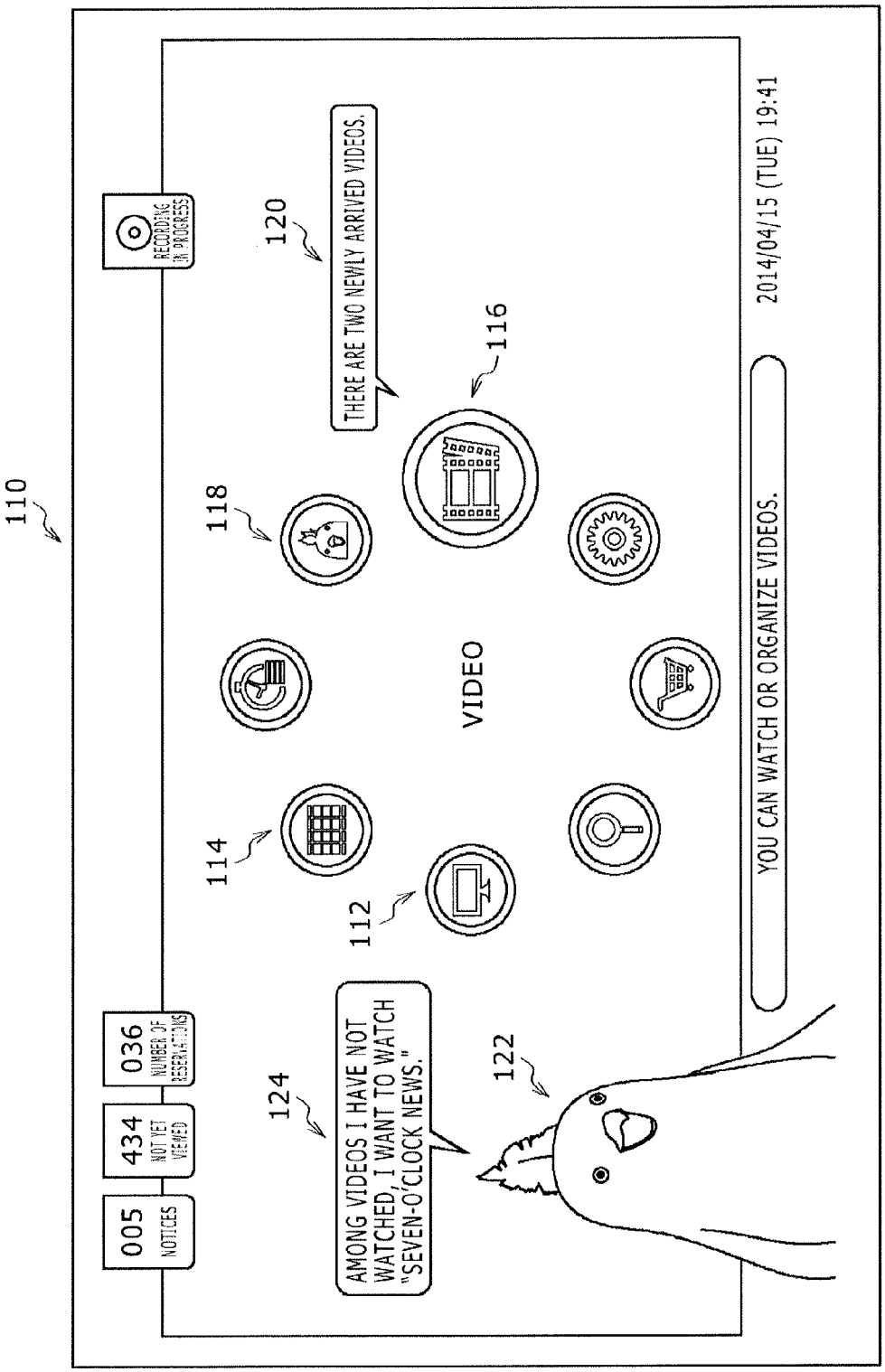
FIG. 6 is a diagram showing a top screen of a program viewing App (Application)

The top screen display section 58 displays the top screen of the program viewing App on the display 24 at the time of the start of the program viewing App. FIG. 6 shows the top screen of the program viewing App. A TV icon 112, an EPG icon 114, a video icon 116, and a recommendation icon 118 are arranged on a top screen 110.

The TV icon 112 is an icon for making a transition to a TV screen on which to view a television program being broadcast now. The EPG icon 114 is an icon for making a transition to an EPG screen that presents a program guide and which receives a recording reservation or the like. The video icon 116 is an icon for making a transition to a video screen on which to reproduce an already recorded program. The recommendation icon 118 is an icon for making a transition to a recommendation information screen that presents recommended program information. The top screen 110 can thus be said to be a common portal screen from which transitions are made to the plurality of kinds of screens related to the viewing and recording of programs.

When a particular broadcasting station is selected on the TV screen to which a transition is made from the top screen 110, the program display section 44 displays the program video of the selected broadcasting station on the display 24, and the viewing state notifying section 48 transmits currently viewed program information to the information managing server 12. In addition, when a recording reservation of a particular program is set on the EPG screen to which a transition is made from the top screen 110, the viewing state notifying section 48 transmits recording reservation program information to the information managing server 12.

The top screen display section 58 displays new arrival information 120 on the top screen 110 according to an icon in a focus state. In FIG. 6, a focus is put on the video icon 116. Thus, new arrival information 120 indicating information on recording states is displayed. When a focus is put on the TV icon 112, the top screen display section 58 displays new arrival information 120 indicating the title of a program having a relatively large viewing value (number of viewers), which is stored in the statistical data retaining section 36. For example, the top screen display section 58 may display the title of a program having a largest viewing value as the new arrival information 120. In addition, when a focus is put on the EPG icon 114, the top screen display section 58 displays the title of a program having a relatively large recording value (number of recording reservations), which is stored in the statistical data retaining section 36, as the new arrival information 120. For example, the top screen display section 58 may display the new arrival information 120 indicating the title of a program having a largest recording value.

The character display section 66 displays a character 122, which is the mascot of the program viewing App, on the top screen 110, and displays a line 124 in a mode indicating that the line 124 is uttered by the character 122. In FIG. 6, a focus is put on the video icon 116. Thus, the comment determining section 64 selects the comment of the ID "0002" in FIG. 3, and the character display section 66 sets the comment text of the ID "0002" as the line 124.

In addition, the program title of recording data associated with a not-yet-viewed flag which recording data is included in the recording data stored in the recording data retaining section 32 is set as the "$ program title" in the comment text. Specifically, in FIG. 6, "seven-o'clock news," which is a recorded program not yet viewed, is set as a recommended program, and a comment to the effect that the character 122 wants to view the recorded program not yet viewed is displayed. It is thereby possible to assist in selecting a reproduction target program on the video screen to which a transition is made by an operation of selecting the video icon 116 (which operation is for example an operation of depressing a predetermined button).

In addition, when a focus is put on the EPG icon 114 on the top screen 110, the character display section 66 may display the comment of the ID "0003" in FIG. 3. That is, a comment to the effect that the character 122 always watches the recommended program determined by the information managing server 12 may be displayed. It is thereby possible to assist in selecting a recording target program on the EPG screen to which a transition is made by an operation of selecting the EPG icon 114.

In addition, when a focus is put on the TV icon 112 on the top screen 110, the character display section 66 may display the comment of the ID "0005" in FIG. 3. That is, a program having a large viewing value may be set as a recommended program, and a comment to the effect that the character 122 likes the program having the large viewing value may be displayed. It is thereby possible to assist in selecting a viewing target program on the TV screen to which a transition is made by an operation of selecting the TV icon 112.

The character display section 66 thus obtains various programs selected according to viewing values, recording values, the states of reproduction of recorded programs, and the like as recommended programs in addition to recommended programs determined by the information managing server 12. Then, comments to the effect that the character 122 has interest in these recommended programs are displayed as the line 124. Therefore, information on a suitable program in accordance with the state of operation of the user can be presented to the user. In addition, even if a program that the character 122 is made to murmur is a program not interesting to the user, the character 122 merely expresses the feeling of the character 122. Therefore offense to the user can be reduced.

When no operating input has been detected for a predetermined time on the top screen 110, the standby screen display section 60 displays a standby screen on the display 24. FIG. 7 shows the standby screen of the program viewing App. The standby screen display section 60 makes a varying display, on the standby screen, of the plurality of icons arranged on the top screen 110.

The character display section 66 displays the character 122 and the line 124 on the standby screen 130. In FIG. 7, the comment determining section 64 selects the comment of the ID "0004" in FIG. 3, and the character display section 66 sets the comment text of the ID "0004" as the line 124. In addition, the program title of recording data associated with an already-viewed flag which recording data is included in the recording data stored in the recording data retaining section 32 is set as the "$ program title" of the comment text.

As is indicated by the screen conditions in FIG. 3, the line 124 presenting program titles meeting various conditions such as recorded programs not yet viewed, recommended programs, already viewed recorded programs, programs having large viewing values, programs having large recording values, and the like is displayed on the standby screen 130. This is because it is not known to which screen the user makes a transition on the standby screen 130 (for example whether the user makes a transition to the TV screen or the EPG screen), or in other words, there are possibilities of various operations, and it is therefore desirable to provide a wide range of information.

When a focus is put on the recommendation icon 118 on the top screen 110, and the input of a selecting operation is detected, the recommendation information screen display section 62 displays a recommendation information screen on the display 24. FIG. 8 shows the recommendation information screen of the program viewing App. The recommendation information screen is a screen for presenting recommended programs determined by the information managing server 12, and is positioned as a screen for presenting recommended programs selected by the character 122.

The recommendation information screen display section 62 identifies programs recorded in the EPG data of the EPG data retaining section 34 among recommended programs provided from the information managing server 12 and stored in the recommendation information retaining section 39. That is, the recommendation information screen display section 62 identifies the programs of broadcasting stations which programs can be viewed by the user among the recommended programs. For example, the EPG data may be searched for a combination of the broadcasting station ID and the program ID of a certain recommended program to thereby determine whether or not the user can view the recommended program.

The recommendation information screen display section 62 arranges and displays, on the recommendation information screen 140, information on a plurality of programs that can be viewed by the user among the recommended programs stored in the recommendation information retaining section 39. Specifically, the recommendation information screen display section 62 obtains the names of broadcasting stations, broadcasting dates and times, and program titles from the EPG data retaining section 34 using combinations of broadcasting station IDs and program IDs of the recommended programs as keys, and displays the names of the broadcasting stations, the broadcasting dates and times, and the program titles on the recommendation information screen 140. The recommended programs that can be viewed in the residential area of the user, or in other words, the area in which the television viewing device 10 is installed are thus displayed on the recommendation information screen 140. Therefore, even when a certain user can view broadcast programs of a key station, and another user can view broadcast programs of a local station, recommended program information meaningful to each user can be presented.

As a modification, the recommendation information obtaining section 56 of the television viewing device 10 may store, in the recommendation information retaining section 39, only the programs recorded in the EPG data of the EPG data retaining section 34 among the plurality of recommended programs provided from the information managing server 12.

As another modification, the filtering of the recommended program information may be performed by the information managing server 12. In this case, the information managing server 12 may retain information on programs that can be viewed by the plurality of users (plurality of television viewing devices 10), respectively. For example, the information managing server 12 may be configured to be able to retain correspondence relations between EPG data for respective areas and the residential areas of the respective users (positions in which the television viewing devices 10 are installed) and identify programs that can be viewed by the respective users. The recommendation information providing section 92 of the information managing server 12 may transmit only information on recommended programs that can be viewed by a user at an information transmission destination, which information is included in the recommended program information retained by the recommendation information retaining section 72, to the television viewing device 10 of the user.

In addition, the recommended programs 142 in FIG. 8 include both of a first recommended program that the recommended content determining section 88 of the information managing server 12 dynamically extracts from a plurality of programs on the basis of the recording reservation states of the plurality of users and a second recommended program arbitrarily set by the staff for the entertainment system 100. For example, a first program, a third program, and a fourth program having recording values of 100 or more may be first recommended programs, and a second program having a recording value of 40 may be a second recommended program. The first recommended programs can be said to be dynamically determined by data processing based on the algorithm for determining the recommended programs. The second recommended program can be said to be statically determined without undergoing the dynamic extraction process, and can also be said to be a program to be recommended to the user for viewing irrespective of the result of the dynamic extraction.

Both of the first recommended programs determined by the algorithm based on viewing states and the second recommended program satisfying conditions other than the viewing states are thus presented to the user. Therefore a program that is not extracted by the algorithm based on viewing states but is considered to deserve recommendation for viewing can be presented to the user. In other words, it is possible to determine recommended programs from various viewpoints without being restricted to a single viewpoint, and present the recommended programs to the user. For example, a program that is not extracted by the dynamic recommended program determination processing but should be recommended to the user for viewing by the empirical rule of the staff can be added to recommended programs. In other words, it is possible to make up for programs excluded by the automatic data processing by the intention, experience, or knowledge of the staff, and present recommended programs based on various viewpoints to the user.

The recommendation information screen display section 62 sets a character comment indicator 144 to recommended programs to which character comments are set among the plurality of recommended programs, or the recommended programs of the IDs "0001" to "0003" in the example of FIG. 4, to suggest to the user that the character will murmur something. The character display section 66 displays the character 122 on the recommendation information screen 140. When a focus is put by a focus frame 146 on a recommended program 142 to which the character comment indicator 144 is added among the recommended programs 142 on the recommendation information screen 140, the character display section 66 further displays the line 124.

In the example of FIG. 8, the line 124 is displayed which represents a character comment (ID "0003" in FIG. 4) associated with the recommended program "Friday drama . . . " on which the focus is put by the focus frame 146. The character display section 66 thus also displays text representing an opinion of a third person in a hearsay form as the line 124 uttered by the character 122. The recommended program on which the focus is put in FIG. 8 is not determined as a recommended program by the recommended content determining section 88 of the information managing server 12 because the recommended program has a small recording value, but the recommended program is added as a recommended program by the staff.

FIG. 9 also shows the recommendation information screen of the program viewing App. In the present example, the line 124 is displayed which represents a character comment (ID "0001" in FIG. 4) associated with the recommended program "weekly amateur singing contest" on which the focus is put by the focus frame 146. The recommended program on which the focus is put in FIG. 9 is determined as a recommended program by the recommended content determining section 88 of the information managing server 12. That is, because the recommended program has a high ratio of one-installment recordings, a comment to the effect that there may be some surprise is set. However, the comment is displayed in a mode merely showing the feeling of the character 122. Thus, even if actual program contents do not include any surprise, the dissatisfaction of the user is reduced easily.

FIG. 10 also shows the recommendation information screen of the program viewing App. In the present example, no character comment indicator 144 is added to the recommended program on which the focus is put by the focus frame 146. That is, a character comment is not yet set to the recommended program on which the focus is put (for example the ID "0004" in FIG. 4). In this case, the character display section 66 does not displays the line 124. Instead, the recommendation information screen display section 62 obtains outline information on the recommended program on which the focus is put from the EPG data retaining section 34, and displays the outline information as a program outline 148.

The character display section 66 records, in the storage portion 30, the number of times that a comment for the character which comment is stored in the character data retaining section 38 has been displayed during one day, and increments the number of times each time a comment is displayed. When the character display section 66 has displayed a comment for the character which comment is stored in the character data retaining section 38 a predetermined number of times during one day, the character display section 66 suppresses subsequent comment display in the same day. In other words, when the character display section 66 has displayed a predetermined number of comments during one day, the character display section 66 suppresses the display of new comments until a next day. This threshold value may be determined by the knowledge and experience of the managing staff or the like. The threshold value may be for example seven times that a comment has been displayed during one day or seven comments that have been displayed during one day.

In addition, while the character display section 66 suppresses the comment display, the character display section 66 displays the character 122 in a mode showing a tired state, a mode showing an angry state, or a mode showing a sulky state. When the next day comes, the character display section 66 returns the number of times of comment display which number is stored in a predetermined storage area to zero, returns the external appearance of the character 122 to a normal state, and resumes comment display. Such comment display suppression processing may be applied also to the display of character comments stored in the recommendation information retaining section 39, that is, the display of character comments on the recommendation information screen 140.

There have recently been cases of lists of lines of the character being collected by a site on the Internet. When no limits are set to the number of times of display of the line 124 for the character 122, all of comments murmured by the character 122 are disclosed, so that the user may lose interest in the comments. In addition, frequent murmurs by the character 122 may annoy the user instead. Accordingly, the number of comments displayed in a unit period such as one day or the like is limited. It is thereby possible to prevent the user from losing interest in the comments, and avoid annoying the user.

In addition, human beings become tired when speaking too much. When the character 122 of the program viewing App operates in a similar manner, it is easier to make the user perceive the character 122 to be alive, as it were. It is thus easier to bring about a sense of closeness to the character 122, and easier to further reduce the fear of offending the user even if a recommended program murmured by the character 122 is irrelevant for the user.

The present technology has been described above on the basis of embodiments thereof. The foregoing embodiments are illustrative, and it is to be understood by those skilled in the art that combinations of constituent elements and processing processes of the embodiments are susceptible of various modifications and that such modifications also fall within the scope of the present technology.

Though not mentioned in the embodiment, the recommended content determining section 88 may retain changes in time series in the ratio of one-installment recordings to a total number of recording reservations of each program. The recommended content determining section 88 may then determine, as a recommended program, a program whose ratio of one-installment recordings to the total number of recording reservations has recently risen by a predetermined threshold value or more. For example, the recommended content determining section 88 may determine, as a recommended program, a program whose ratio of one-installment recordings to the total number of recording reservations has risen by 20% or more during the last two days. As in the embodiment, a recommended program may be determined according to the above-described algorithm among narrowed-down recommendation candidate programs. A program whose ratio of one-installment recordings to the total number of recording reservations has risen sharply can be said to be a program that has become a topic of conversation also among users who do not usually view the program, and can therefore be said to be suitable as a recommended program.

In addition, in the foregoing embodiment, contents recommended to the user for viewing by cooperation of the information managing server 12 and the television viewing device 10 are television programs. However, the technology described in the embodiment is of course applicable also to cases where various kinds of digital contents and electronic contents are recommended to the user. For example, the user can be prompted in a suitable mode to the viewing, purchase, or the like of various musical pieces, moving images, still images, games, websites, or the like.

In addition, the configuration of the information managing server 12 described in the embodiment can be expressed as follows. An information processing device includes: an obtaining section obtaining a type of recording reservation from each of a plurality of users making recording reservations of a program broadcast in a plurality of installments; and a determining section determining the program as a recommended program to be recommended to another user for viewing on a basis of whether the type of recording reservation of the program by each user is an en bloc recording reservation of broadcasts of the plurality of installments or a recording reservation of a broadcast of one installment.

In addition, the configuration of the information managing server 12 can also be expressed as follows. An information processing device includes: an obtaining section obtaining a type of recording reservation from each of a plurality of users making recording reservations of a program broadcast in a plurality of installments; and a determining section determining the program as a recommended program to be recommended to another user for viewing when a ratio of recording reservations of a broadcast of one installment rather than en bloc recording reservations of broadcasts of the plurality of installments to a total number of recording reservations of the program is equal to or higher than a predetermined threshold value.

Arbitrary combinations of the embodiment and the modifications described above are also useful as embodiments of the present technology. New embodiments created by the combinations combine the respective effects of the embodiment and the modifications combined with each other. In addition, it is to be understood by those skilled in the art that functions to be performed by respective constituent elements described in claims are implemented by single bodies of the respective constituent elements illustrated in the embodiment and the modifications or cooperation of the constituent elements.

For example, the recommendation information obtaining section described in claims may be realized by the cooperation of the recommendation information obtaining section 56 and the recommendation information screen display section 62 described in the embodiment. In addition, as described in the embodiment, the viewing state described in claims includes the setting states of recording reservations by a plurality of users for a program scheduled to be broadcast in the future (in other words, viewing reservation states). The viewing state described in claims also includes the present viewing states of the plurality of users for a program being broadcast now (in other words, viewing selection states).

The present disclosure contains subject matter related to that disclosed in Japanese Priority Patent Application JP 2014-104890 filed in the Japan Patent Office on May 21, 2014, the entire content of which is hereby incorporated by reference.

What is claimed is:

1. An information processing device comprising:
    a recommendation information obtaining section obtaining information on a recommended content to be recommended to a user for viewing, the information being information transmitted from an external device or information stored in a predetermined storage area in advance,
        wherein the recommended content comprises a first recommended content and a second recommended content different than the first recommend content; and
    a character display section displaying a predetermined character on a screen, and displaying information indicating that the character has interest in the first recommended content and the second recommended content on the screen,
    wherein the first recommended content obtained by the recommendation information obtaining section includes an episode of a program broadcast in a plurality of installments,
    wherein the episode is chosen as the first recommended content only if:
        (a) a total number of recordings of the episode is greater than a first predetermined threshold, and,
        (b) a ratio of a number of single recordings of the episode to a number of every installment recordings of the program broadcast in the plurality of installments is greater than a second predetermined threshold,
    wherein single recordings are recordings of only the episode and not every episode of the program broadcast in the plurality of installments, and
    wherein every installment recordings are recording of every episode of the program broadcast in the plurality of installments,
    wherein the second recommended content obtained by the recommendation information section includes a result of a search for a program having a trending keyword, and
    wherein the first recommended content and the second recommended content are updated periodically by the recommendation information obtaining section.

2. The information processing device according to claim 1,
    wherein the character display section displays a plurality of texts as lines uttered by the character on the screen, and displays a text to an effect that the character has interest in the recommended content as one of the lines.

3. The information processing device according to claim 1, further comprising:
    a program guide retaining section retaining a program guide showing information on broadcast programs viewable by the user; and
    a recommendation information display section,
    wherein the recommendation information obtaining section obtains information on a plurality of broadcast programs as information on a plurality of recommended contents, the information on the plurality of recommended contents being transmitted from the external device, and
    the recommendation information display section displays information on broadcast programs included in the program guide among the plurality of broadcast programs.

4. An information processing method for a computer, comprising:
    obtaining information on a recommended content to be recommended to a user for viewing, the information being information transmitted from an external device or information stored in a predetermined storage area in advance,
        wherein the recommended content comprises a first recommended content and a second recommended content different than the first recommend content,
    wherein the first recommended content includes an epi code of a program broadcast in a plurality of installments,
    wherein the episode is chosen as the first recommended content only if:
        (a) a total number of recordings of the episode is greater than a first predetermined threshold, and,
        (b) a ratio of a number of single recordings of the episode to a number of every installment recordings of the program broadcast in the plurality of installments is greater than a second predetermined threshold,
    wherein single recordings are recordings of only the episode and not every episode of the program broadcast in the plurality of installments, and
    wherein every installment recordings are recording of every episode of the program broadcast in the plurality of installments,
    wherein the second recommended content obtained by the recommendation information section includes a result of a search for a program having a trending keyword;
    displaying a predetermined character on a screen; and
    displaying information indicating that the character has interest in the recommended content on the screen,
        wherein the first recommended content and the second recommended content are updated periodically by the external device.

5. The information processing device according to claim 1, wherein the trending keyword is a keyword that has become a topic on various kinds of social networking services.

* * * * *